United States Patent
Loper et al.

(10) Patent No.: US 12,097,516 B2
(45) Date of Patent: *Sep. 24, 2024

(54) IRRIGATION CONTROL BASED ON A USER ENTERED NUMBER OF WATERING PASSES

(71) Applicant: Rain Bird Corporation, Azusa, CA (US)

(72) Inventors: Patrick V. Loper, Oro Valley, AZ (US); Stuart Hackwell, Oro Valley, AZ (US); David E. Colombo, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,375

(22) Filed: Jul. 14, 2023

(65) Prior Publication Data
US 2023/0356247 A1 Nov. 9, 2023

Related U.S. Application Data

(63) Continuation of application No. 17/147,313, filed on Jan. 12, 2021, now Pat. No. 11,738,361.
(Continued)

(51) Int. Cl.
*B05B 12/00* (2018.01)
*B05B 12/02* (2006.01)
(Continued)

(52) U.S. Cl.
CPC ............ *B05B 12/002* (2013.01); *B05B 12/02* (2013.01); *B05B 12/16* (2018.02); *G05B 19/042* (2013.01); *G05B 2219/2625* (2013.01)

(58) Field of Classification Search
CPC ....... B05B 12/002; B05B 12/02; B05B 12/16; G05B 19/042; G05B 2219/2625; A01G 25/165
See application file for complete search history.

(56) References Cited

U.S. PATENT DOCUMENTS 5,251,153 A 10/1993 Nielsen
5,444,611 A 8/1995 Woytowitz
(Continued)

FOREIGN PATENT DOCUMENTS

WO WO-9939567 A1 * 8/1999 ............. A01G 25/16

OTHER PUBLICATIONS

Novagric; "Travelling Irrigators for Seedlings"; <https://www.novagric.com/en/irrigation/irrigation-supplies/travelling-irrigators>; Oct. 14, 2019; 3 pages.
(Continued)

*Primary Examiner* — Chad G Erdman
(74) *Attorney, Agent, or Firm* — Fitch, Even, Tabin & Flannery, LLP

(57) ABSTRACT

In some embodiments, a system for controlling irrigation comprises an irrigation control unit comprising: an input configured to receive a user entered number of watering passes for a rotary sprinkler configured to repetitively rotate about an arc and irrigate an area of an irrigation site, wherein each rotation about the arc comprises a watering pass; a memory to store the number of watering passes and arc rotation data for the rotary sprinkler corresponding to a time duration for the rotary sprinkler to make the watering pass about the arc; and a control circuit configured to: receive the number of watering passes; receive the arc rotation data; determine a run time that will result in irrigation by the rotary sprinkler about the arc for the user entered number of passes; and store the run time.

20 Claims, 7 Drawing Sheets

Related U.S. Application Data

(60) Provisional application No. 62/966,426, filed on Jan. 27, 2020.

(51) Int. Cl.
*B05B 12/16* (2018.01)
*G05B 19/042* (2006.01)

(56) References Cited

U.S. PATENT DOCUMENTS

| | | |
|---|---|---|
| 7,584,023 B1 * | 9/2009 | Palmer ................ G05B 19/042 |
| | | 239/69 |
| 8,311,786 B2 | 11/2012 | Kisch |
| 8,733,155 B2 | 5/2014 | Hill |
| 8,827,178 B2 | 9/2014 | Roney |
| 9,192,110 B2 | 11/2015 | Standerfer |
| 9,242,255 B2 | 1/2016 | Lichte |
| 11,738,361 B2 | 8/2023 | Loper |
| 2014/0110498 A1 | 4/2014 | Nelson |

OTHER PUBLICATIONS

USPTO; U.S. Appl. No. 17/147,313; Non-Final Rejection mailed Oct. 24, 2022; (16 pages).
USPTO; U.S. Appl. No. 17/147,313; Notice of Allowance and Fees Due (PTOL-85) mailed Apr. 14, 2023; (8 pages).

* cited by examiner

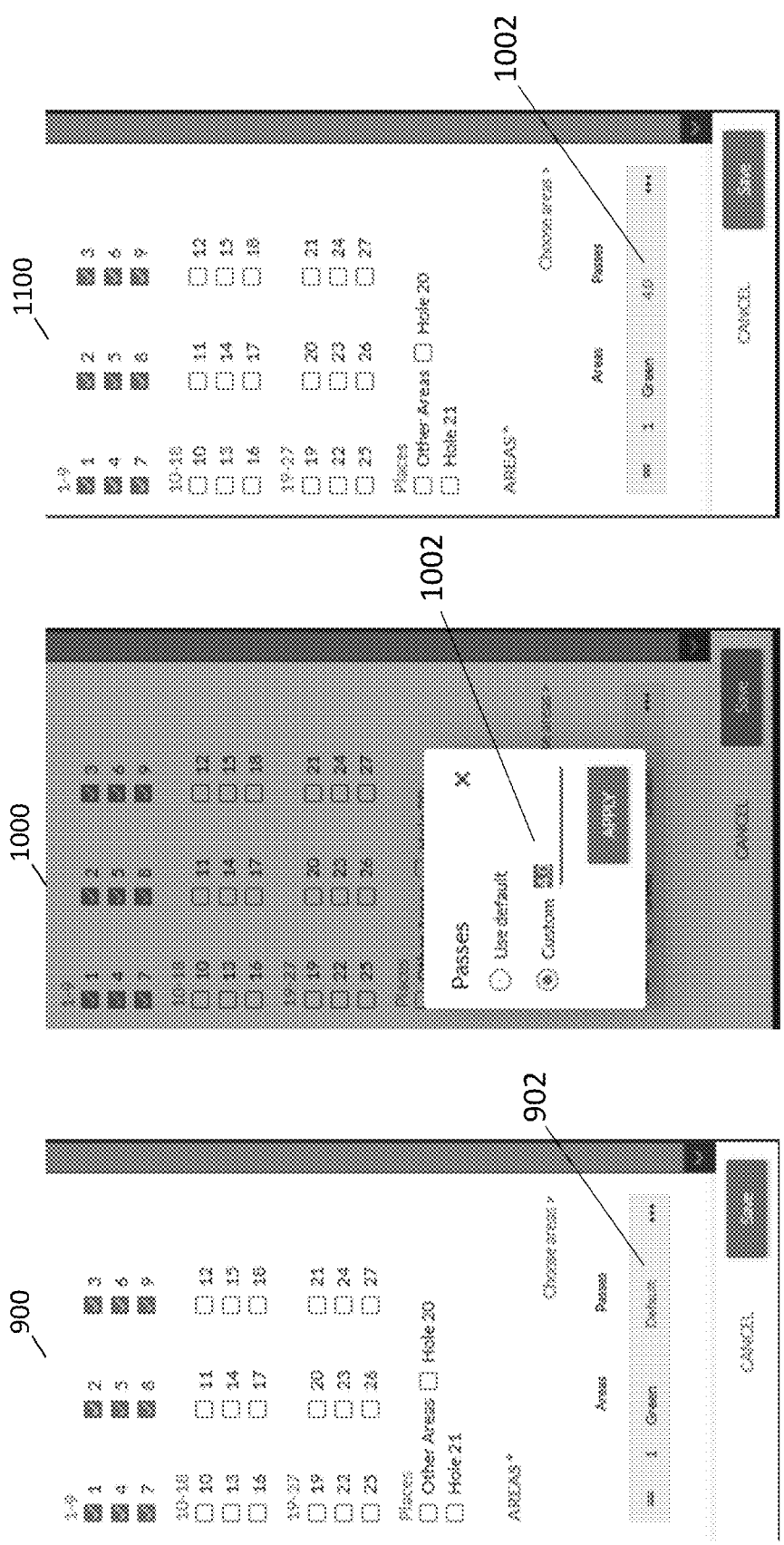

IRRIGATION CONTROL BASED ON A USER ENTERED NUMBER OF WATERING PASSES

CROSS-REFERENCE TO RELATED APPLICATION

This application is a continuation of U.S. application Ser. No. 17/147,313 filed Jan. 12, 2021, which claims the benefit of U.S. Provisional Application No. 62/966,426 filed Jan. 27, 2020, both of which are incorporated herein by reference in their entirety.

TECHNICAL FIELD

This invention relates generally to irrigation control and specifically relates to irrigation control based on control of the irrigation run time.

BACKGROUND

In a typical irrigation control system, a computer executing irrigation control software and/or a dedicated electronic irrigation controller store and execute irrigation schedules that control watering components in a landscape to apply watering. Irrigation is applied for a period of time (run time) input by the user or determined by the software. For example, the user enters that a given sprinkler or sprinklers will irrigation for 15 minutes, and the system causes the controller to turn on irrigation for those sprinkler/s for 15 minutes (by controlling a valve coupled to the sprinkler/s). In some cases, the sprinkler can be a rotary sprinkler or rotor that rotates while irrigating to apply water to a small angle spray or stream at one time but rotates across the range of rotation (arc) to cover the entire area to be irrigated. In some situations the user wants the control system to apply watering for a limited number of passes of the sprinkler, such as when fertilizer is applied. For example, the user may want the sprinkler to make three passes of irrigation over the plant life after the fertilizer has been applied. It is difficult for the user to determine how long to water to make sure that three passes are made. If there is not enough water applied, the fertilizer may dry on the plant life. And if there is too much water applied, the fertilizer may wash away. The right run time is difficult to determine because sprinklers of different types can have different nozzle sizes, pressure ratings, and rotation speed. And even if these variables are known, the sprinkler may not be set for a full 360 degrees of rotation, i.e., the arc setting may be less than 360 degrees. Thus, users guess at the number of minutes of watering needed.

BRIEF DESCRIPTION OF THE DRAWINGS

Disclosed herein are embodiments of systems, apparatuses and methods pertaining to controlling irrigation. This description includes drawings, wherein:

FIGS. 6-11 are exemplary user interface displays to allow a user to enter the number of watering passes in according with some embodiments.

Figure 1:
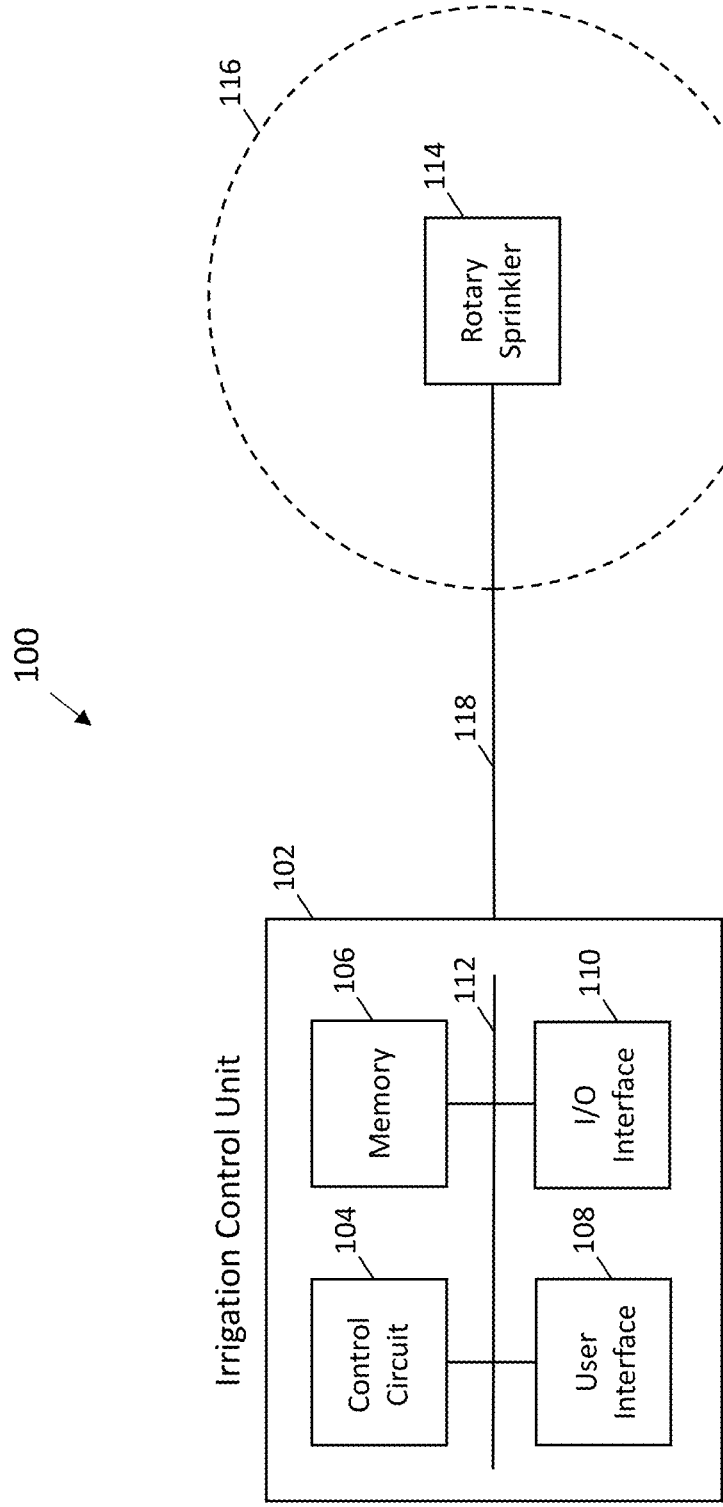
FIG. 1 is a functional block diagram of an irrigation system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful in controlling irrigation according to a user entered number of watering passes that the user would like a rotary sprinkler to make, and the irrigation control functionality will automatically determine the run time for that sprinkler that will result in the user entered number of watering passes. In some embodiments, a user interface allows the entry of the number of watering passes which is input to an irrigation control unit. In some embodiments, an irrigation control unit receives the user entered number of watering passes and arc rotation data for the sprinkler, the arc rotation data corresponding to a time duration for the rotary sprinkler to make the watering pass about the arc. In some embodiments, the irrigation control unit determines, using the user entered number of passes and the arc rotation data, a run time that will result in irrigation by the rotary sprinkler about the arc for the user entered number of passes.

Accordingly, in some embodiments, a system for controlling irrigation, comprises an irrigation control unit comprising: an input configured to receive a user entered number of watering passes for a rotary sprinkler configured to repetitively rotate about an arc and irrigate an area of an irrigation site, wherein each rotation about the arc comprises a watering pass; a memory coupled to the input and configured to store the user entered number of watering passes, the memory also configured to store arc rotation data for the rotary sprinkler corresponding to a time duration for the rotary sprinkler to make the watering pass about the arc; a control circuit coupled to the input and the memory, the control circuit configured to: receive the user entered number of watering passes; receive the arc rotation data; determine, using the user entered number of watering passes and the arc rotation data, a run time that will result in irrigation by the rotary sprinkler about the arc for the user entered number of passes; and store the run time.

In some embodiments, a method for use in controlling irrigation, comprising: by a control circuit of an irrigation control unit, receiving a user entered number of watering passes for a rotary sprinkler configured to repetitively rotate about an arc and irrigate an area of an irrigation site, wherein each rotation about the arc comprises a watering pass; receiving arc rotation data for the rotary sprinkler corresponding to a time duration for the rotary sprinkler to make the watering pass about the arc; determining, using the user entered number of watering passes and the arc rotation data, a run time that will result in irrigation by the rotary sprinkler about the arc for the user entered number of watering passes; and storing, in a memory, the run time.

Referring to FIG. 1, a functional block diagram is shown of an irrigation system 100 in accordance with some embodiments. An irrigation control unit 102 includes a control circuit 104, a memory 106, a user interface 108 and an input/output (I/O) interface 110 coupled to each other by a communication bus 112. The irrigation control unit 102 is coupled to a rotary sprinkler 114 via a control line 118. The rotary sprinkler 114 is a sprinkler that applies water at a small angle spray or stream at one time while rotating across the range of rotation or irrigation arc 116 (illustrated in FIG. 1 as a 360 degree arc) to cover an area to be irrigated. Such rotary sprinklers are well known in the irrigation arts. It is further known that rotary sprinklers can be set or controlled such that the arc 116 is less than 360 degrees, for example, 90, 180, 270 degrees. Some rotary sprinklers rotate mechanically under water pressure and the arc can be mechanically limited, and other rotary sprinklers use stepper motors to control rotation and arc.

Turning to the components of the irrigation control unit 102, in some embodiments, the memories 106 comprises one or more non-transitory computer-readable storage mediums storing a set of computer readable instructions. Such memories may comprise volatile and/or non-volatile memory such as such as RAM, ROM, EEPROM, flash memory and/or other memory technology, and have stored upon it a set of computer readable instructions which, when executed by the control circuit 104, causes the control circuit 104 to provide at least the various functions described herein. The one or more memories can also store irrigation related control data (e.g., data relating to the components of the irrigation system) and programming data (e.g., irrigation schedules, programs, weather data and so on).

In some embodiments, the control circuit 104 is a processor-based device including one or more processors. The control circuit 104 and the memory 106 may be integrated together, such as in a microcontroller, application specification integrated circuit, field programmable gate array or other such device, or may be separate devices coupled together. Generally, the control circuit 104 can comprise a fixed-purpose hard-wired platform or can comprise a partially or wholly programmable platform. These architectural options are well known and understood in the art and require no further description here. And generally, the control circuit 104 is configured (for example, by using corresponding programming as will be well understood by those skilled in the art) to carry out one or more of the steps, actions, and/or functions described herein.

The irrigation control unit 102 also includes one or more I/O interfaces 110 such as, ports, connectors, pins, transceivers and the like allowing the irrigation control unit 102 to interface with other circuitry, power supplies and components, communication devices to communicate with other onboard and/or remote systems, other control units, sensors, and so on. Communication devices can be configured for wired, wireless, optical, fiber optical cable or other such communication configurations or combinations of such communications.

In some embodiments, the user interface 108 comprises input devices to receive user data and includes output or display devices to display data and/or to prompt users for input data. Input devices can take many forms including buttons, switches, dials, keyboard, touchscreen input, audio input, for example. Display devices can take many forms such as display screens, touch display screens, lights, light emitting diodes, and so on.

In some embodiments, the irrigation control unit 102 is located on the same site as the rotary sprinkler 114. In some embodiments, the irrigation control unit 102 is located remotely from the irrigation site as the rotary sprinkler 114 and is coupled to the sprinkler 114 via a wide area network and additional irrigation control components (such as an irrigation controller) at the irrigation site.

The irrigation control unit 102 can take several forms. In some embodiments, the irrigation control unit 102 is a server remote from the irrigation site and coupled by a wide area network to an irrigation device at the irrigation site that controls the rotary sprinkler 114. For example, the server is a cloud server hosted by an irrigation company and providing irrigation control services (such as irrigation schedule creation, management and execution) from a remote central location to multiple different users or customers. The cloud server is coupled to the sprinkler 114 via an irrigation controller at the site and is connected to the irrigation controller via the wide area network (such as the Internet, cellular network, etc.). In some embodiments, the remote server is owned and operated by the user or customer and has irrigation central control software installed thereon. In other embodiments, the irrigation control unit 102 is a computer coupled to the irrigation device at the irrigation site that controls the rotary sprinkler 114. Such computer may be a customer owned computer having irrigation central software installed thereon. In other embodiments, the irrigation control unit 102 is a stand-alone or dedicated electronic irrigation controller at the irrigation site that controls the rotary sprinkler 114. And in other embodiments, the irrigation control unit 102 is a mobile electronic device (e.g., a smart phone or tablet device) including irrigation control software (e.g., an irrigation control app) and configured to wirelessly communicate to one or more network devices and to the irrigation device at the irrigation site that controls the rotary sprinkler 114.

While only one rotary sprinkler 114 is illustrated in FIG. 1, it is understood that an irrigation control unit 102 may control tens or hundreds of rotary sprinklers 114 and other various types of sprinkler devices that are non-rotary depending on the scale of the system.

Figure 2:
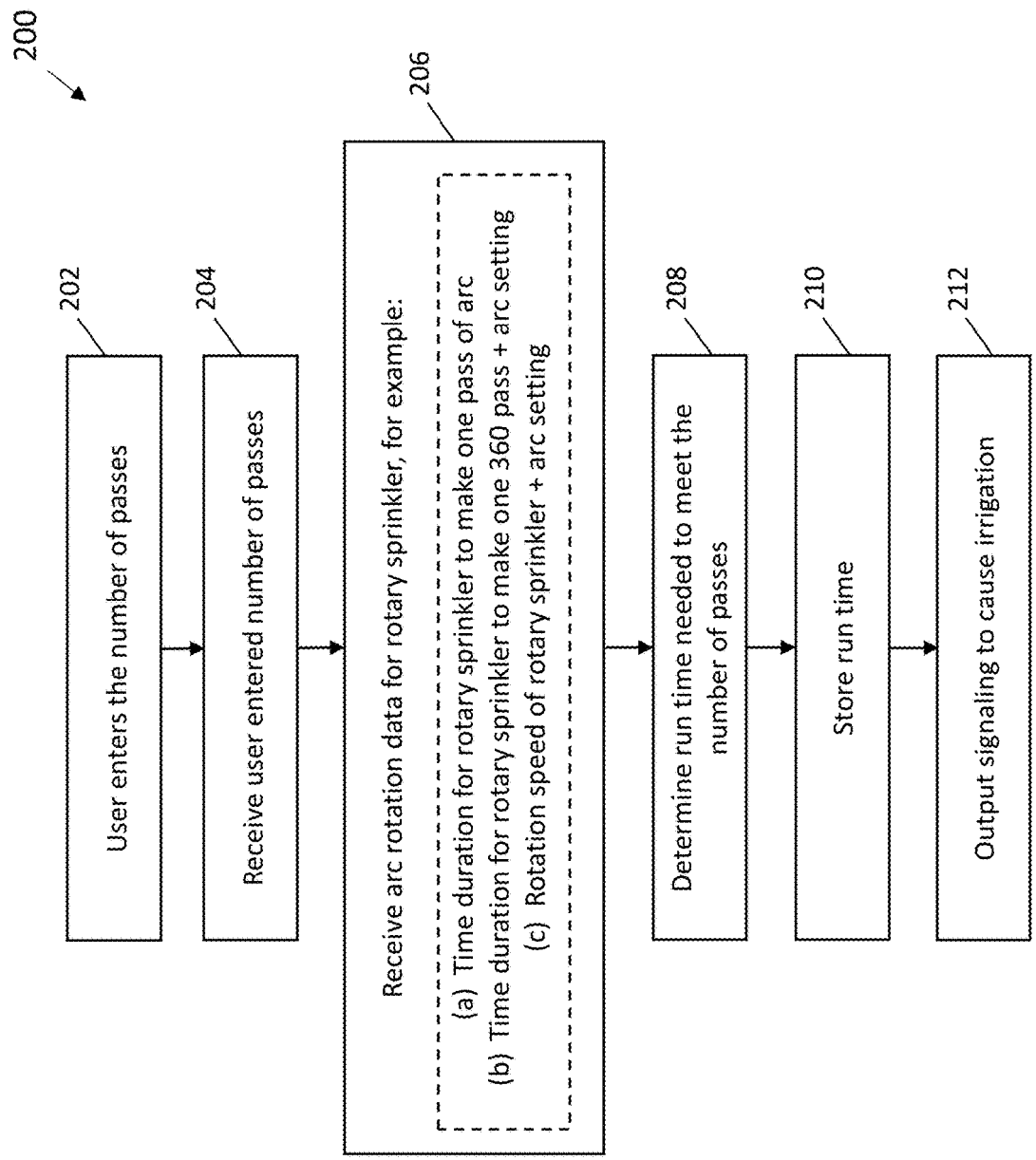
FIG. 2 is a flow diagram illustrating steps performed in a method in accordance with some embodiments.

Referring next to FIG. 2, a flow diagram is shown that illustrates steps performed in a method 200 in accordance with some embodiments. Various irrigation control units, such as the irrigation control unit 102 of FIG. 1, can perform the method of FIG. 2. In some embodiments, a method is provided where a user enters a desired number of watering passes for the sprinkler rather than having to guess and enter the time duration that the user believes will meet the desired number of watering passes. In some embodiments, the irrigation control unit determines the run time specific to a given rotary sprinkler as set or configured that will result in the number of watering passes specified by the user. Such embodiments eliminate watering errors and guess work by users. For example, the time duration to meet a desired number of watering passes is difficult for most users to determine because sprinklers of different types can have different nozzle sizes, pressure ratings, and rotation speed. And even if these variables are known to the user, the sprinkler may not be set for a full 360 degrees of rotation (the arc setting is less than 360 degrees). In large scale systems where there are tens or hundreds of rotary sprinklers, it may be difficult to determine what the speed and arc setting is for a specific rotary sprinkler. Thus, many users are left to guess at the number of minutes of watering needed to meet a desired number of watering passes. Some embodiments simplify this by allowing the user to simply enter the number of passes, and the irrigation control unit determines the run time.

First, the user enters the number of watering passes that the user would like a given rotary sprinkler to make, where the rotary sprinkler is configured to repetitively rotate about an arc and irrigate an area of an irrigation site, where each rotation about the arc comprises a watering pass (Step 202). The user may enter such input by using an input of the irrigation control unit 102, such as via the user interface 108. The user may enter this number in a variety of ways. For example, the user may enter this value on the user interface of a computer or mobile device using an irrigation control application or at the user interface of a dedicated electronic irrigation controller. In some embodiments, the user interface is configured to prompt for and receive the user entered number of watering passes. In some embodiments, the user interface is an electronic user interface displayed to the user on a display screen and further comprising a user input device to allow the user to enter the user entered number of passes. In some embodiments, the user interface is an electronic user interface displayed to the user on a display screen and allowing the user to enter the user entered number of watering passes on the display screen, e.g., a touch sensitive display screen, such as common on some computers and with mobile electronic devices, like tablets and smart phones. See FIGS. 6-11 for an example computer user interface. The user entered number of watering passes is stored in memory.

Next, the control circuit receives the user entered number of watering passes for the rotary sprinkler (Step 204). For example, this value is retrieved from the memory 106. The control circuit also receives arc rotation data for the rotary sprinkler, the arc rotation data corresponding to a time duration for the rotary sprinkler to make the watering pass about the arc (Step 206). For example, this data is retrieved from the memory 106. Generally, the arc rotation data can take various forms. In some embodiments, the arc rotation data is the time duration for the rotary sprinkler to make the watering pass about the given arc. In some cases, an arc setting has been placed on the rotation such that the arc is less than 360 degrees. In some cases, the memory stores a time duration that corresponds to the given rotary sprinkler at a given arc setting. In some embodiments, the arc rotation data is a time duration for the rotary sprinkler to make the watering pass about a full 360 degree arc, and an arc setting defining a portion of the 360 degree arc for the rotary sprinkler, e.g., an arc setting defining that the arc is 90, 180, 270 degrees, or any other settable non-zero value less than 360 degrees. In other embodiments, the arc rotation data is a rotation speed of the rotary sprinkler defined in units of rotation degree portion over time, and the arc setting defining the portion of the 360 degree arc for the rotary sprinkler, e.g., the portion may be per degree, per 5 degrees, per 10 degrees, and so on. The form of the arc rotation data depends on the irrigation control system in place and the data stored in the memory of the irrigation control unit.

Figure 3:
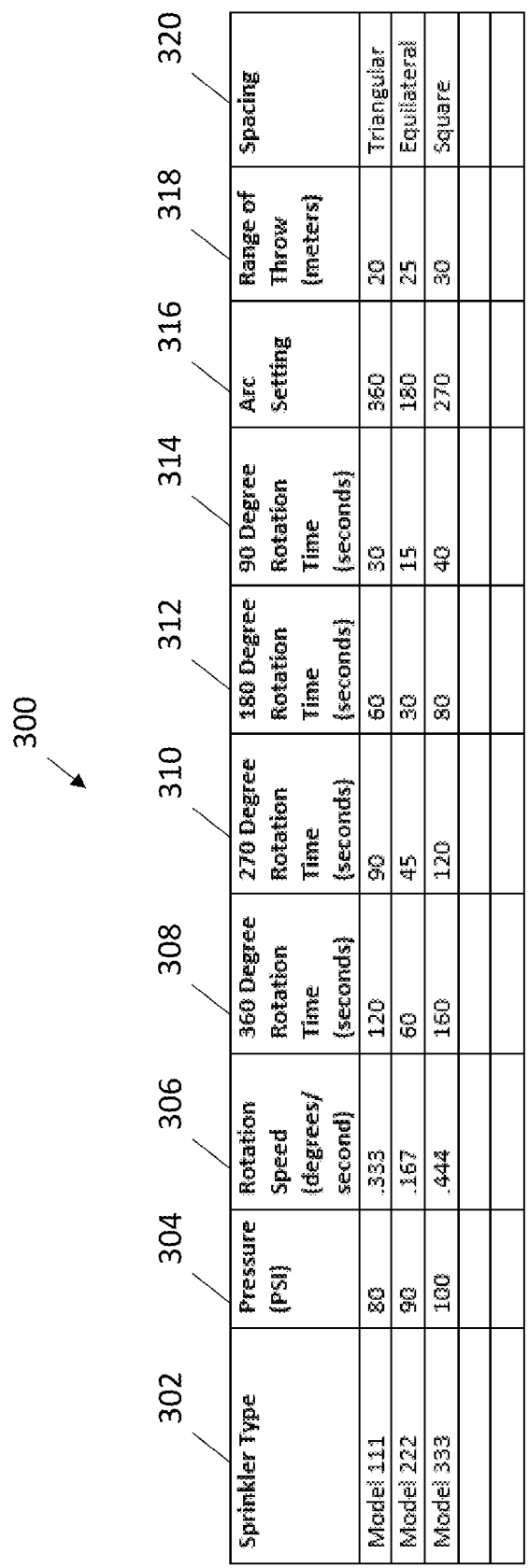
FIG. 3 is a diagram of a database stored in a memory of an irrigation control unit in accordance with some embodiments.

Referring briefly to FIG. 3, a diagram is shown of an example database stored in a memory of an irrigation control unit (e.g., in the memory 106) in accordance with some embodiments. In this example database 300, data is stored for each rotary sprinkler managed by the system. In some embodiments, such data includes one or more of: a sprinkler type 302 (more generally, sprinkler identification data); a pressure rating value 304 from the manufacturer (pressure rating data); a rotation speed 306 in units of degrees over time (such as degrees/second) (rotation speed data); a 360 degree rotation time 308 in units of time (time duration data); a 270 degree rotation time 310 in units of time (time duration data); a 180 degree rotation time 312 in units of time (time duration data); a 90 degree rotation time 314 in units of time (time duration data); an arc setting 316 defining the rotation range of the arc (e.g., a non-zero value up to and including 360) (arc setting data); a range of throw 318, i.e., how far the rotary sprinkler will throw the irrigation stream, from the manufacturer (throw range data); and a sprinkler spacing 320 (spacing arrangement data) that defines a geometric spacing of the system in relation to neighboring rotary sprinklers.

Typically, 302, 304 and 318 are provided by the manufacturer and entered, copied or imported into the database. In some embodiments, one or more of 306, 308, 310, 312, and 314 are provided by the manufacturer and entered, copied or imported into the database, whereas in some embodiments, one of more of this data is determined and entered by the user via a user interface. In some embodiments, the arc setting 316 and the sprinkler spacing 320 are defined by the user and entered via the input into the database. It is understood that some databases may include additional time values corresponding to other allowable arc setting values. For example, if an arc setting 316 of 50 degrees is allowed, then a time duration value for a 50 degree arc may be stored in the database. In some embodiments, the various values for arc setting less than 360 are not stored, since the corresponding time duration value can be determined (e.g., calculated) by a control circuit. For example, a 90 degree arc setting would have a time duration equaling the full arc rotation multiplied by 0.25. And in some embodiments, only the rotation speed 306 and arc setting 316 is stored since the time duration may be calculated from these values. Accordingly, in some embodiments, the arc setting 316 is a user entered value between 1 and 360 degrees, inclusive. In some embodiments, the arc setting 316 is a user entered value having a value of one of: 90, 180, 270 and 360 degrees.

Referring back to FIG. 2, once the control circuit has received the user entered number of watering passes for the rotary sprinkler (Step 204) and the arc rotation data (Step 206), the control circuit determines, using the user entered number of passes and the arc rotation data, a run time that will result in irrigation by the rotary sprinkler about the arc for the user entered number of passes (Step 208). Given these inputs the control circuit can determine this run time, e.g., through a calculation or a lookup in the database. How the determination is made varies depending on the arc rotation data retrieved from the memory.

In some embodiments, where the received arc rotation data is the time duration for the rotary sprinkler to make the watering pass about the given arc, the run time is determined by multiplying the retrieved time duration for the given arc by the user entered number of watering passes. For example, if the retrieved time duration for a 360 degree arc is 120 seconds and the user entered number of passes is 3, then the run time needed for 3 passes would be 120×3 or 360 seconds of watering. In another example, if the retrieved time duration for a 180 degree arc is 60 seconds and the user entered number of passes is 3, then the run time needed for 3 passes would be 60×3 or 180 seconds of watering. That is, the run time may be calculated from the formula:

$RT=(T_n)(P)$, where RT is the run time, $T_n$ is the time duration for an n degree arc, and P is the user entered number of passes.

In some embodiments, the arc rotation data is: a time duration for the rotary sprinkler to make the watering pass about a full 360 degree arc; and an arc setting defining a portion of the 360 degree arc for the rotary sprinkler, e.g., an arc setting defining that the arc is 90, 180, 270 degrees, or any other settable non-zero value less than 360 degrees. In this case, the control circuit calculates the time duration for a single watering pass at the arc setting less than 360 and multiplies this by the user entered number of watering passes. In this case, the run time may be calculated from the formula:

$RT=[(T360)(AS)(P)]/360$, where RT is the run time, T360 is the time duration for a full 360 degree arc, AS is the arc setting, and P is the user entered number of passes.

In other embodiments, the arc rotation data is: a rotation speed of the rotary sprinkler defined in units of rotation degree portion over time; and the arc setting defining the portion of the 360 degree arc for the rotary sprinkler. For example, a rotation speed of 0.333 degrees/second and an arc setting of 180 degrees are received from the memory. In this case, the control circuit calculates the time duration for a single watering pass by multiplying the rotation speed by the arc setting, 0.333×180 is about 60 seconds, and then multiplying by the user entered number of watering passes. In this case, the run time may be calculated from the formula:

$RT=(RS)(AS)(P)$, where RT is the run time, RS is rotation speed, AS is the arc setting, and P is the user entered number of passes.

It is noted that these are several examples of the type of arc rotation data used in some embodiments. It is understood that there are other variables, factors and formulas that could be considered in other embodiments. The form of the arc rotation data depends on the irrigation control system and the data stored in the memory of the irrigation control unit.

Once the run time is determined (Step 208), the run time is stored (Step 210), for example in the memory 106. Then, signaling is output (e.g., by the irrigation control unit 102) to cause the irrigation to occur by the rotary sprinkler for the run time determined (Step 212). When the rotary sprinkler is operated for the determined run time, the rotary sprinkler will apply irrigation to the plant life for the user entered number of watering passes. There are various ways that the signaling can be output to cause the irrigation depending on the control protocols used in the irrigation control system. For example, the signaling could be in the form of a turn on irrigation signal following by a turn off irrigation signal after the desired run time has ended. In some embodiments, the irrigation signaling is in the form of a manual on command for the station of the rotary sprinkler for the determined run time. In another embodiment, the signaling could result in temporary or permanent schedule or irrigation program changes to the schedule or program controlling operation of the rotary sprinkler. For example, an irrigation schedule may define the watering days, the start time, the watering frequency per watering day and the run time, and the run time is adjusted. The run time may be replaced or a scaling factor may be output to cause the irrigation controller (which may or may not be the irrigation control unit that determines the run time) to scale the scheduled run time to the determined run time. In other embodiments, an irrigation program may be defined that applies to multiple stations including the rotary sprinkler and other similarly operating or configured sprinklers. In this case, the run time of the program may be similarly changed, adjusted or scaled to result in the determined run time.

Figure 4:
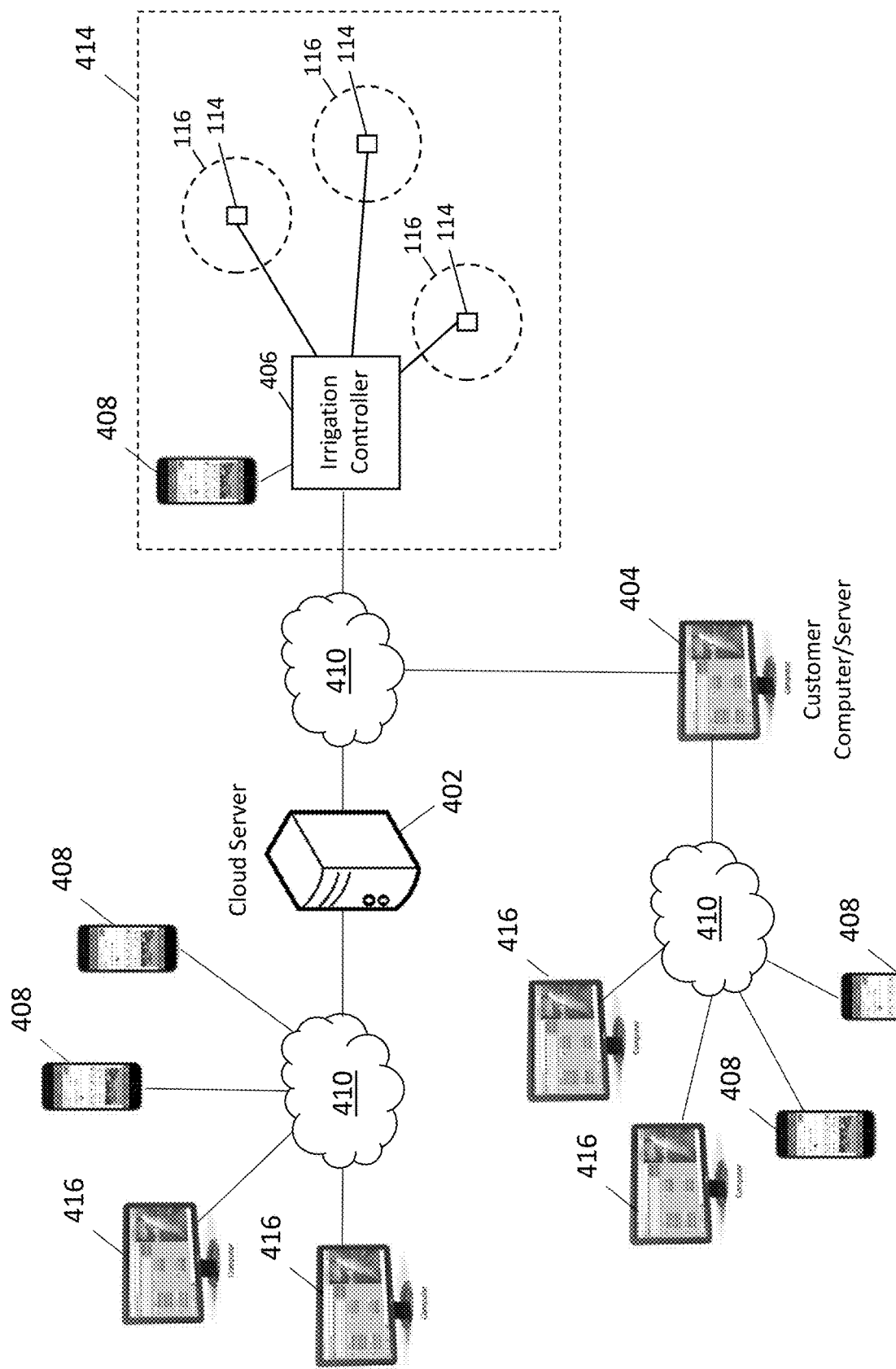
FIG. 4 is a diagram of a central control based irrigation system in accordance with some embodiments.

Referring to FIG. 4, a diagram is shown of a central control based irrigation system in accordance with some embodiments. The diagram of FIG. 4 helps to illustrates various embodiments of the irrigation control unit 102.

In some embodiments, the irrigation control unit 102 is a server 402 remote from the irrigation site 414 and coupled by a wide area network 410 to a local irrigation controller 406 (irrigation device) at the irrigation site 414 that controls at least multiple rotary sprinklers 114, and including a specified rotary sprinkler or rotary sprinklers that the user would like to water for the number of watering passes. For example, the server 402 is a cloud server hosted by an irrigation company and providing irrigation control services (such as irrigation schedule creation, management and execution) from a remote central location to multiple different users or customers via remote computers 416 and/or mobile electronic devices 408. The cloud server 402 is coupled to the sprinkler/s 114 via an irrigation controller 406 (or more generically, an irrigation device at the irrigation site that controls the rotary sprinkler) at the site and is connected to the irrigation controller 406 via the wide area network 410 (such as the Internet, cellular network, etc.). In some embodiments, the remote server 402 is owned and operated by the user or customer and has irrigation central control software installed thereon. In some embodiments, the irrigation control unit 102 functionality is implemented at the server 402. The server 402 provides a user interface to the user that is viewed by the user at their respective remote computer 416 and/or mobile electronic device 408. The user enters the user entered number of watering passes via this user interface, and the entry is received at an input of the server 402 and stored in its memory. The output signals from the server 402 are transferred to the irrigation controller 406. In some forms, the irrigation controller 406 stores and executes irrigation schedules generated by the server 402 and sent to the irrigation controller 406, while in other embodiments, the server 402 sends on/off commands to the irrigation controller 406. It is understood that in some embodiments, the range of watering shown by the arcs 116 in FIG. 4 may be such that there is spatial overlap in the arcs according to the system design.

In other embodiments, the irrigation control unit 102 is a computer 404 (or server) coupled to the irrigation controller 406 (irrigation device at the irrigation site that controls the rotary sprinkler) that controls the rotary sprinkler 114. While the computer 404 is illustrated as not being at the irrigation site 414, in some embodiments, the computer 404 is at the irrigation site 414. Such computer 404 may be a customer owned computer having irrigation central software installed thereon. This computer 404 functions similarly to the cloud server 402 in that is provides irrigation control services (such as irrigation schedule creation, management and execution) from a remote or on-site location to multiple users of the customer via remote computers 416 and/or mobile electronic devices 408. The computer 404 is coupled to the sprinkler/s 114 via an irrigation controller 406 (or irrigation device) at the site and is connected to the irrigation controller 406 via the wide area network 410 (such as the Internet, cellular network, etc.) or other local computer network (wired and/or wireless local area network) if on-site. In some embodiments, the irrigation control unit 102 functionality is implemented at the computer 404. The computer 404 provides a user interface to the user that is viewed by the user at their respective remote computer 416 and/or mobile electronic device 408. The user enters the user entered number of watering passes via this user interface, and the entry is received at an input of the computer 404 and stored in its memory. The output signals from the computer 404 are transferred to the irrigation controller 406. In some forms, as described above, the irrigation controller 406 stores and executes irrigation schedules generated by the computer 404 and sent to the irrigation controller 406, while in other embodiments, the computer 404 sends on/off commands to the irrigation controller 406.

And in other embodiments, the functionality of the irrigation control unit 102 is implemented in the mobile electronic device 408 including irrigation control software (e.g., an iOS or Android-based irrigation control application) and that is configured to wirelessly communicate to one or more network devices and to one or more of the remote server 402, the computer 404 and the on-site irrigation controller 406 (irrigation device at the irrigation site that controls the rotary sprinklers 114). In such case, the mobile application (mobile app) of the mobile device 408 provides a user interface to the user to allow the user to provide the number of watering passes. The mobile application can store the database needed to determine the run time to meet the number of watering passes. In such embodiments, the mobile device 408 can transmit wireless signals to one or more of the cloud server 402, the computer 404 and the irrigation controller 406 to provide the signaling to be delivered to the irrigation controller 406 to cause the irrigation to occur for the determined run time.

Figure 5:
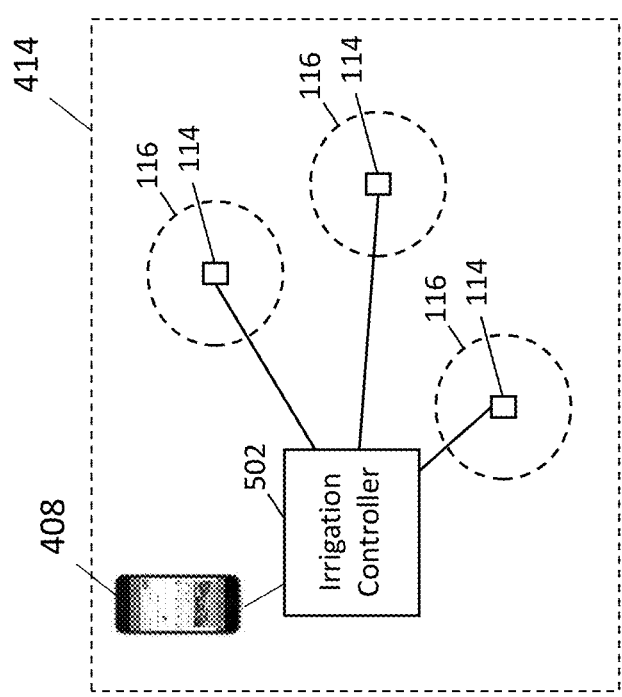
FIG. 5 is a diagram of a dedicated electronic irrigation controller based irrigation system in accordance with some embodiments.

Referring to FIG. 5, a diagram is shown of a dedicated electronic irrigation controller based irrigation an system including an irrigation controller 502 that controls the operation of rotary sprinklers 114 in accordance with some embodiments. In these embodiments, the functionality of the irrigation control unit 102 is implemented in the irrigation controller 502. For example, the irrigation controller 502 provides the user interface (e.g., display screen, buttons, dial, display, programming menus and options, etc.) to allow the user enter the number of watering passes. In some forms, the irrigation controller 502 can communicate with the mobile electronic device 408 and use the user interface of the device 408 to prompt for and receive the user entered number of watering passes. In this case, all scheduling is generated and controlled by the irrigation controller. And the control signaling to cause the rotary sprinkler 114 to irrigation for the determined run time may take the form of zone activation signals (low voltage power signals) applied to the rotary sprinkler 114 by the controller 502.

Figures 6, 7, 8:
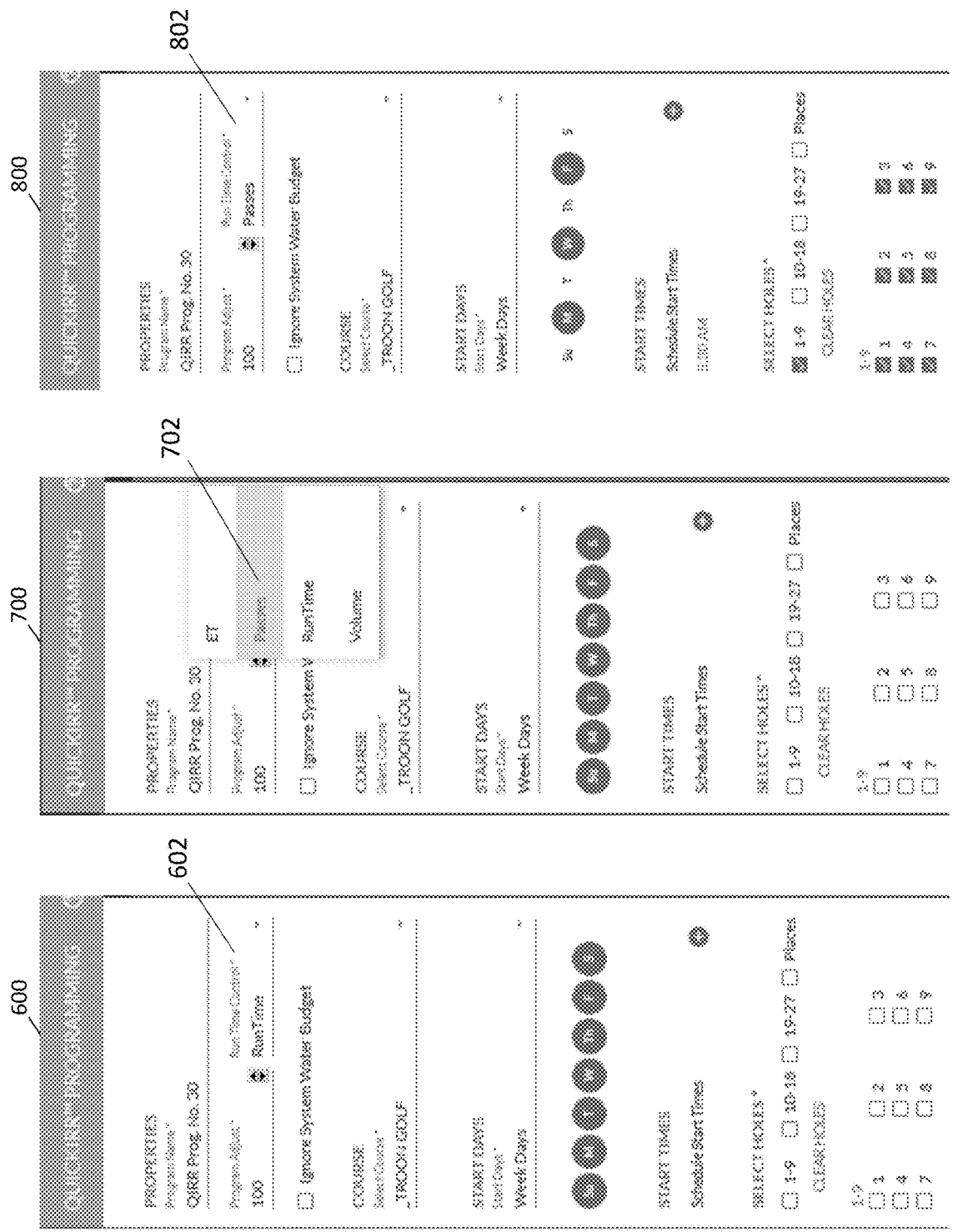

Referring next to FIGS. 6-11, exemplary user interface displays 600, 700, 800, 900, 1000, and 1100 are shown to allow a user to enter the number of watering passes in according with some embodiments. These displays may be generated and displayed on a computer display and/or on a display of a mobile electronic device. In FIG. 6, the user interface display 600 illustrates a programming menu which illustrates a selectable Run Time Control feature 602. When selected in the user interface display 700 of FIG. 7, the user has the choice of selecting ET, Passes, RunTime and Volume, and selects Passes 702, which is now shown as Passes 802 in the user interface display 800 of FIG. 8. Also illustrated in FIG. 8 are the selection of watering start days (M, W, F), start times (5:30 am) and holes (1-9) that will be run according to watering passes. It is noted that this will result in the irrigation of all rotary sprinklers at holes 1-9 to run according to user entered number of passes. Scrolling further down as can be seen in the user interface display 900 of FIG. 9, the number of passes is currently shown as default 902, and when selected, allows the user to select the default value or select a custom number of watering passes 1002 as shown in the user interface display of FIG. 10 (here 4.0 passes is entered by the user). Once apply is clicked in FIG. 10, the user interface display 1100 now shows the user entered number of watering passes 1002 having been entered as 4.0. Clicking save in FIG. 11 will save the value. As can be seen, in the embodiments of FIGS. 6-11, the user interface prompts for and receives the user entered number of passes. As can be seen, the user interface of FIGS. 6-11 is an electronic user interface displayed to the user on a display screen and includes a user input device (e.g., keyboard and mouse) to allow the user to enter the user entered number of passes. In some embodiments, for example, when implemented on a touch sensitive display screen, the user interface is an electronic user interface displayed to the user on a display screen and that allows the user to enter the user entered number of passes on the display screen.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for controlling irrigation, comprising:
   an irrigation control unit comprising:
      an input configured to receive a user entered number of watering passes for a rotary sprinkler configured to repetitively rotate about a defined arc and irrigate an area of an irrigation site, wherein each rotation about the defined arc comprises a watering pass;
      a memory coupled to the input and configured to store the user entered number of watering passes, the memory also configured to store arc rotation data for the rotary sprinkler, wherein the arc rotation data represents a time duration for the rotary sprinkler to make the watering pass about the defined arc; and
      a control circuit coupled to the input and the memory, the control circuit configured to:
         receive the user entered number of watering passes;
         receive the arc rotation data;
         determine, using the user entered number of watering passes and the arc rotation data, a run time that will result in irrigation by the rotary sprinkler for the user entered number of watering passes; and
         store the run time.

2. The system of claim 1 wherein the arc rotation data stored in the memory comprises one or more of:
   the time duration for the rotary sprinkler to make the watering pass about the defined arc;
   a time duration for the rotary sprinkler to make the watering pass about a 360 degree arc, and an arc setting defining a portion of the 360 degree arc for the rotary sprinkler; and
   a rotation speed of the rotary sprinkler defined in units of rotation degree portion over time, and the arc setting defining the portion of the 360 degree arc for the rotary sprinkler.

3. The system of claim 2 wherein the memory stores a database configured to store data comprising one or more of the following:
- sprinkler identification data for a plurality of rotary sprinklers;
- pressure rating data for the plurality of rotary sprinklers;
- rotation speed data for the plurality of rotary sprinklers;
- time duration data for one more arc settings for the plurality of rotary sprinklers;
- arc setting data for the plurality of rotary sprinklers;
- throw range data for the plurality of rotary sprinklers; and
- spacing arrangement data for the plurality of rotary sprinklers.

4. The system of claim 2 wherein the arc setting comprises a user entered value between 1 and 360 degrees.

5. The system of claim 2 wherein the arc setting comprises a user entered value having a value of one of: 90, 180, 270 and 360 degrees.

6. The system of claim 2 wherein the rotation speed and the arc setting for the rotary sprinkler are received at the input and stored in the memory.

7. The system of claim 1 further comprising:
- a user interface coupled to the input, wherein the user interface is configured to prompt for and receive the user entered number of watering passes.

8. The system of claim 7 wherein the user interface comprises an electronic user interface displayed to the user on a display screen and further comprising a user input device to allow the user to enter the user entered number of watering passes.

9. The system of claim 7 wherein the user interface comprises an electronic user interface displayed to the user on a display screen and allowing the user to enter the user entered number of watering passes on the display screen.

10. The system of claim 1 wherein the irrigation control unit comprises one of:
- a server remote from the irrigation site and coupled by a wide area network to an irrigation device at the irrigation site that controls the rotary sprinkler;
- a computer coupled to the irrigation device at the irrigation site that controls the rotary sprinkler;
- an irrigation controller at the irrigation site that controls the rotary sprinkler;
- a mobile electronic device including irrigation control software and configured to wirelessly communicate to one or more network devices and to the irrigation device at the irrigation site that controls the rotary sprinkler.

11. A method for use in controlling irrigation, comprising: by a control circuit of an irrigation control unit,
- receiving a user entered number of watering passes for a rotary sprinkler configured to repetitively rotate about a defined arc and irrigate an area of an irrigation site, wherein each rotation about the defined arc comprises a watering pass;
- receiving arc rotation data for the rotary sprinkler, wherein the arc rotation data represents a time duration for the rotary sprinkler to make the watering pass about the defined arc;
- determining, using the user entered number of watering passes and the arc rotation data, a run time that will result in irrigation by the rotary sprinkler for the user entered number of watering passes; and
- storing, in a memory, the run time.

12. The method of claim 11 wherein the arc rotation data is stored in the memory and comprises one or more of:
- the time duration for the rotary sprinkler to make the watering pass about the defined arc;
- a time duration for the rotary sprinkler to make the watering pass about a 360 degree arc, and an arc setting defining a portion of the 360 degree arc for the rotary sprinkler; and
- a rotation speed of the rotary sprinkler defined in units of rotation degree portion over time, and the arc setting defining the portion of the 360 degree arc for the rotary sprinkler.

13. The method of claim 12 wherein the memory stores a database configured to store data comprising one or more of the following:
- sprinkler identification data for a plurality of rotary sprinklers;
- pressure rating data for the plurality of rotary sprinklers;
- rotation speed data for the plurality of rotary sprinklers;
- time duration data for one more arc settings for the plurality of rotary sprinklers;
- arc setting data for the plurality of rotary sprinklers;
- throw range data for the plurality of rotary sprinklers; and
- spacing arrangement data for the plurality of rotary sprinklers.

14. The method of claim 12 wherein the arc setting comprises a user entered value between 1 and 360 degrees.

15. The method of claim 12 wherein the arc setting comprises a user entered value having a value of one of: 90, 180, 270 and 360 degrees.

16. The method of claim 12 further comprising:
- receiving the rotation speed and the arc setting for the rotary sprinkler at an input of the irrigation control unit; and
- storing the rotation speed and the arc setting in the memory.

17. The method of claim 11 further comprising:
- prompting, via a user interface coupled to an input of the irrigation control unit, the user to enter the user entered number of watering passes.

18. The method of claim 17 wherein the user interface comprises an electronic user interface displayed to the user on a display screen and further comprising:
- allowing, via a user input device of the user interface, the user to enter the user entered number of watering passes.

19. The method of claim 17 wherein the user interface comprises an electronic user interface displayed to the user on a display screen and further comprising:
- allowing the user to enter the user entered number of watering passes on the display screen.

20. The method of claim 11 wherein the irrigation control unit comprising one of:
- a server remote from the irrigation site and coupled by a wide area network to an irrigation device at the irrigation site that controls the rotary sprinkler;
- a computer coupled to the irrigation device at the irrigation site that controls the rotary sprinkler;
- an irrigation controller at the irrigation site that controls the rotary sprinkler;
- a mobile electronic device including irrigation control software and configured to wirelessly communicate to one or more network devices and to the irrigation device at the irrigation site that controls the rotary sprinkler.

* * * * *